United States Patent [19]

Coughlin et al.

[11] Patent Number: 4,842,741
[45] Date of Patent: Jun. 27, 1989

[54] HETEROGENEOUS MEMBRANES FROM HIGHLY FILLED THERMOPLASTIC ORIENTABLE POLYMERS

[75] Inventors: Michael C. Coughlin; Arthur Z. Moss, both of Wilmington, Del.; Kenneth E. Stevens, Kingston, Canada

[73] Assignee: Du Pont Canada Inc., Mississauga, Canada

[21] Appl. No.: 172,837

[22] Filed: Mar. 25, 1988

[51] Int. Cl.$^4$ ...................... B01D 13/00; B01D 13/04
[52] U.S. Cl. ............................ 210/500.36; 210/490; 264/41; 264/288.8
[58] Field of Search ........................... 210/500.36, 490

[56] References Cited

U.S. PATENT DOCUMENTS

| | | | |
|---|---|---|---|
| 4,613,441 | 9/1986 | Kohno et al. | 210/500.36 |
| 4,734,196 | 3/1988 | Kono et al. | 210/500.36 |
| 4,743,375 | 5/1988 | Seita et al. | 210/500.36 |

Primary Examiner—Morton Foelak

[57] ABSTRACT

A film having a porous core layer and nonporous outer layers is disclosed. It is suitable for controlled atmosphere packaging end uses. The film is made from a composition of certain polymers, particularly ethylene polymers, a particulate filler which has little affinity for the polymer, and optionally an organic compound which decreases the tendency for affinity of the particulate for the polymer. The film is produced by extruding the composition through a die gap of at least 250 μm, and subsequently stretching the film after cooling to a temperature below the melting temperature of the polymer.

6 Claims, 3 Drawing Sheets

HETEROGENEOUS MEMBRANES FROM HIGHLY FILLED THERMOPLASTIC ORIENTABLE POLYMERS

The present invention relates to a flexible film, suitable for controlled atmosphere packaging, which is comprised of a porous interior and a substantially nonporous skin.

It is known to package fruit and vegetables in plastic films and to regulate, to an extent, the ripening and/or spoiling of such fruit and vegetables by controlling the atmosphere in the package. For example, U.S. Pat. No. 4,079,152 which issued Mar. 14, 1978 to Bedrosian et al., discloses that ripening of tomatoes may be limited by packaging the tomatoes in a film having an oxygen permeability of 75–3000 cm$^3$/100 in$^2$/day and a carbon dioxide permeability of 500–15,000 cm$^3$/100 in$^2$/day, and the sealed package includes a carbon dioxide absorbent and a packet of desiccant material. The packaging film is preferably low density polyethylene.

Heterogeneous membranes, suitable for separating gases, are also known. For example, U.S. Pat. No. 4,664,681, which issued May 12, 1987 to T. Anazawa and Y. Ono, discloses a heterogeneous membrane which has a microporous layer containing pores 0.01–50 μm in diameter, and a nonporous layer on the inner or outer surface of the membrane containing no pores with diameters of at least 30 angstroms and having a thickness of 0.01–1 micron. The membrane is produced in a three-step process involving, in the first step, melt extrusion of a film, followed by controlled cooling and, if necessary, heat treatment of the film at such a rate that a minimum degree of crystallinity of 30% is achieved; in the second step, monoaxially stretching the film; and in the third step, heat setting the film. Preferred polymers are poly-4-methylpentene-1, polypropylene, polyethylene or polyoxymethylene. The membrane has a thickness of 1–300 microns, an oxygen/nitrogen separation coefficient at 25° C. of 1.2 or more, and has three or more times as high an oxygen permeability coefficient at 25° C. as a nonporous homogeneous membrane of the same material. The high degree of polymer crystallinity required to produce the morphology characteristic of the membrane of Anzawa and Ono results in a film that is stiffer and less ductile than the films of the present invention.

Canadian Patent No. 1 169 619, which issued June 16, 1984, to C. R. Ashcraft and H. C. Park, discloses a heterogeneous membrane produced by coextrusion of a polyolefin, containing 10 wt. % or less inorganic fillers with an unfilled polyolefin, to form a film which, when stretched biaxially, results in a membrane with a porous core and nonporous skin. It is believed that the structure of the skin of the membranes of the present invention, and the manner by which it is formed, is inherently different from that disclosed by Ashcraft and Park.

Microporous films, having good water vapour transmission rates and hydrostatic resistance to the penetration of liquid water, are known. For example, U.S. Pat. No. 4,698,372, which issued Oct. 6, 1987 to A. Z. Moss, discloses a film obtained by stretching a composition consisting of a matrix of a thermoplastic orientable polymer having a hydrophobic surface, a glass transition temperature of less than 25° C., a Vicat softening point of more than about 25° C., an ultimate elongation between those two temperatures of at least 100%, and a flexural modulus of less than 200 MPa, and 20–40 vol. % of a particulate filler having an aspect ratio of less than 3, an average diameter of 0.05–50 μm, a negligible attraction to the matrix polymer, and a surface tension no higher than that of the matrix polymer at the latter's melting temperature. The requisite surface tension may be provided by adsorbing on the surface of the filler an organic compound to the extent of at least about $0.5 \times 10^{-5}$ mole of the organic compound per square metre of surface area of the filler. The organic compound has negligible solubility in the matrix polymer and chemical inertness to the matrix polymer, has a number average molecular weight of about 100–10 000, and a surface tension which at a temperature at which the organic compound is liquid has a value at most about equal to that of the matrix polymer.

A film such as described in U.S. Pat. No. 4,698,372, which is microporous throughout its thickness, may be unsuitable for use in certain modified atmosphere packaging applications, for example, where excessive loss of moisture would be undesirable and/or where it is desired to prevent the passage of low surface tension liquids such as oils and fuels, or by aerosols. An improvement in the manner of processing some of the compositions of U.S. Pat. No. 4,698,372, to provide a novel film suitable for use in modified atmosphere packaging applications has now been found. The film of the present invention has a substantially nonporous surface and a porous interior which tends to have a relatively high carbon dioxide, ethylene and air flux with relatively low water vapour transmission rate and relatively high resistance to penetration by low surface tension liquids and aerosols.

Accordingly, the present invention provides a process for making a heterogeneous membrane film, from a composition comprising a thermoplastic orientable polymer and a particulate filler, said thermoplastic orientable polymer being characterized by (i) a hydrophobic surface, as indicated by a contact angle between said surface and a droplet of water of at least about 40°, (ii) a glass transition temperature $T_g$ of less than about 25° C., (iii) a Vicat softening point $T_v$ of more than about 25° C., (iv) an ultimate elongation at a temperature between $T_g$ and $T_v$ of at least 100%, and (v) a flexural modulus at 25° C. of less than about 200 MPa, said polymer being selected from the group consisting of (a) at least one copolymer of ethylene and at least one other monomer, said monomer being selected from the group consisting of vinyl esters of saturated $C_1$–$C_4$ carboxylic acids, unsaturated $C_3$–$C_5$ mono- or dicarboxylic acids, salts of such mono- or dicarboxylic acids with ammonia and/or with metals of Groups I–IV of the Periodic Table, and $C_1$–$C_8$ alkyl esters of said mono- or dicarboxylic acids; (b) at least one terpolymer of the general formula E/X/Y, where E is ethylene, X is butyl acrylate or vinyl acetate, and Y is carbon monoxide or sulphur dioxide, the weight proportion of Y to (E+X+Y) being up to about 15%; (c) at least one of elastomeric dipolymers and terpolymers of ethylene with other 1-olefins and 1,4-dienes; (d) mixtures of at least two of (a), (b) and (c); and (e) at least one copolyetherester; said particulate filler being in a concentration of about 20–40%, based on the volume of the composition, said particulate filler being chemically unreactive with the polymer and dispersed therein by melt-blending, and being characterized by (i) a sufficient high softening temperature to avoid particle distortion at the lowest temperature at which the polymer is sufficiently fluid to be satisfactorily melt-blended, (ii) an aspect ratio of less than about 3, (iii) an average equivalent spherical diameter of about 0.50–50 μm, (iv) an at most negligible electrostatic or dipole attraction to the polymer, and (v) a surface tension which either has at the lowest temperature at which the polymer is sufficiently fluid to be satisfactorily melt-blended a value at most about equal to that of the polymer or has been modified by the adsorption of an organic compound to have at most such a value, said organic compound, if present, being liquid at the lowest temperature at which the polymer is sufficiently fluid to be satisfactorily melt-blended and being capable at that temperature of being adsorbed on the surface of the filler to the extent of at least about $0.5 \times 10^{-5}$ mole of the organic compound per square metre of surface area of the filler, as calculated from the average equivalent spherical diameter of the filler, and being present in an amount at least sufficient to satisfy the surface tension requirement, said organic compound being characterized by (i) at most negligible solubility on the polymer at the melt-blending temperature, (ii) chemical inertness to the polymer, (iii) a number average molecular weight of 100–10 000, and (iv) a surface tension which at a temperature at which the organic compound is liquid has a value at most about equal to that of the polymer, said process comprising:

(i) extruding said composition through a film die having a die gap of at least about 250 μm, at a temperature above the melting temperature of said polymer, to form an extrudate in film form;

(ii) cooling said extrudate to a temperature below the melting temperature of said polymer to form a film; and (iii) stretching said film at a temperature below the Vicat softening point of said polymer;

selecting said composition, die gap and stretching conditions to form a film having a substatially nonporous surface and a porous interior.

The polymers useful in the present invention may be modified to achieve desired properties. For example, modification may take place after formation the film, by chemical or radiative crosslinking or heat setting, or before formation of the film, by plasticization. It has been found that use of polymer-soluble additives used conventionally to plasticize the unfilled polymer can increase the range of porosity and pore size achievable from a given composition.

In one embodiment, the composition is extruded through a die gap of at least about 750 μm, and preferably through a die gap of between about 1000 and 2000 μm.

In a preferred embodiment the extrudate is stretched while in the plastic formative state at a drawdown ratio of up to 40, especially from 2 to 20, and preferably from 3 to 15.

In a further embodiment stretching of the film, in step (iii) is monoaxial in the machine direction at a stretch ratio of from 2 to 6, especially from 2.5 to 5. It is preferred that such stretching take place at a temperature of at least 20° C. above the glass transition temperature of the matrix polymer, and preferably below the Vicat softening temperature of the matrix polymer, especially at least 10° C. below the Vicat softening temperature, depending to some degree on the rate of stretching. The preferred temperature for stretching a given composition is believed to be at a temperature within the range of from 10° C. above the glass transition temperature the Vicat softening point at which test specimens of the composition display the highest degree of orientability in a standard stress-strain test.

In another embodiment the polymer is selected from the group of polymer blends which also satisfy the requirements of the present invention, even though the individual polymers may not do so. Typical polymer blends include, for example, (a) two different ethylene/vinyl acetate copolymers and (b) a blend of an ethylene/vinyl acetate copolymer and linear ethylene/alpha-olefin copolymer having a density of 0.93 g/cm³ or less.

In a yet another embodiment the polymer is an ethylene/vinyl acetate copolymer.

In another embodiment the polymer is a copolyetherester which is a copolymer of a phthalic acid and a diol providing "hard" segments. Preferably the diol is 1,4-butanediol.

In yet another embodiment the polymer is a copolyetherester which is a copolymer of a phthalic acid and a diol providing "soft" segments. Preferably the diol is poly(tetramethyleneether glycol).

In another embodiment the particulate filler has an average equivalent spherical diameter of from 0.50 to 20 μm, especially from 0.50 to 10 μm, and more especially from 3 to 10 μm.

In a further embodiment the particulate is selected from the group consisting of calcium carbonate, barium sulphate, powdered metals, magnesium carbonate, calcium sulphate, silica, glass spheres, aluminium hydroxide, nylon 6,6, polyethylene terephthalate and poly(styrene divinyl benzene).

In yet another embodiment the polymer is an ethylene/vinyl acetate copolymer and the produce of the die gap, in micrometers, and the average equivalent spherical diameter of the particulate filler, in micrometers, is at least 3000, and preferably at least 4000.

As used herein the term aspect ratio means the ratio of the largest dimension to the smallest dimension of a particle. For any given filler, the aspect ratio is the average value determined for a representative number of particles by examination through a microscope.

As used herein the term equivalent spherical diameter means the diameter of a sphere having the same volume.

Flexural modulus is measured using the procedure of ASTM D-790 and, unless otherwise indicated, is quoted herein in MPa.

Glass transition temperature $T_g$ is measured using the procedure of ASTM D-3418-75, using differential scanning calorimetry (DSC).

Vicat softening point is measured using the procedure of ASTM D-1525.

Ultimate elongation is measured using the procedure of ASTM D-638.

Surface contact angle is measured using the procedure of ASTM D-1922-67 using a goniometer.

Surface tension is measured at 70° C. by the Du Nouy ring method, using a 7045 (trade mark) tensiometer manufactured by Central Scientific Co., Division of CSC Scientific Corp., Broadview, Ill., U.S.A. The value of the surface tension at the mixing temperature, which is generally about 180° C., is obtained by assuming a decrease with temperature of 0.1 mg/m²/°C. Surface tension of polymers may be obtained from the book entitled Polymer Interface and Adhesion, by S. Wu, published by Marcel Dekker, Inc., (1982). Where data for specific polymers is not available, surface tension may be estimated from data for materials of similar composition.

As used herein the term drawdown ratio, for flat film dies, is defined as the ratio of the die gap to the thickness of the cooled film. For circular dies, viz dies used in so-called blown film processes, the drawdown ratio is defined as the ratio of the die gap to the product of the thickness of the cooled film and the blow-up ratio. Blow-up ratio is the ratio of the diameter of the cooled film bubble to the diameter of the circular die.

The present invention also provides a heterogeneous membrane film comprising a composition comprising a thermoplastic orientable polymer and a particulate filler, said thermoplastic orientable polymer being characterized by (i) a hydrophobic surface, as indicated by a contact angle between said surface and a droplet of water of at least about 40°, (ii) a glass transition temperature $T_g$ of less than about 25° C., (iii) a Vicat softening point $T_v$ of more than about 25° C., (iv) an ultimate elongation at a temperature between $T_g$ and $T_v$ of at least 100%, and (v) a flexural modulus at 25° C. of less than about 200 MPa, said polymer being selected from the group consisting of (a) at least one copolymer of ethylene and at least one other monomer, said monomer being selected from the group consisting of vinyl esters of saturated $C_1$-$C_4$ carboxylic acids, unsaturated $C_3$-$C_5$ mono- or dicarboxylic acids, salts of such mono- or dicarboxylic acids with ammonia and/or with metals of Groups I-IV of the Periodic Table, and $C_1$-$C_8$ alkyl esters of said mono- or dicarboxylic acids; (b) at least one terpolymer of the general formula E/X/Y, where E is ethylene, X is butyl acrylate or vinyl acetate, and Y is carbon monoxide or sulphur dioxide, the weight proportion of Y to (E+X+Y) being up to about 15%; (c) at least one elastomeric dipolymers and terpolymers or ethylene with other 1-olefins and 1,4-dienes; (d) mixtures of at least two of (a), (b) and (c); and (e) at least one copolyetherester; said particulate filler being in a concentration of about 20-40%, based on the volume of the composition, said particulate filler being chemically unreactive with the polymer and dispersed therein by melt-blending, and being characterized by (i) a sufficiently high softening temperature to avoid particle distortion at the lowest temperature at which the polymer is sufficiently fluid to be satisfactorily melt-blended, (ii) an aspect ratio of less than about 3, (iii) an average equivalent spherical diameter of about 0.50-50 μm, (iv) an at most negligible electrostatic or dipole attraction to the polymer, and (v) a surface tension which either has at the lowest temperature at which the polymer is sufficiently fluid to be satisfactorily melt-blended a value at most about equal to that of the polymer or has been modified by the adsorption of an organic compound to have at most such a value, said organic compound, if present, being liquid at the lowest temperature at which the polymer is sufficiently fluid to be satisfactorily melt-blended and being capable at that temperature of being adsorbed on the surface of the filler to the extent of at least about $0.5 \times 10^{-5}$ mole of the organic compound per square meter of surface area of the filler, as calculated from the average equivalent spherical diameter of the filler, and being present in an amount at least sufficient to satisfy the surface tension requirement, said organic compound being characterized by (i) at most negligible solubility on the polymer at the melt-blending temperature, (ii) chemical inertness to the polymer, (iii) a number average molecular weight of 100-10 000, and (iv) a surface tension which at a temperature at which the organic compound is liquid has a value at most about equal to that of the polymer, said film being characterized by a core layer sandwiched between two outer layers, said core layer having pores consisting of a network of cavities surrounding the filler particles, having a substantial absence of cracks in the polymer and a low degree of apparent adhesion between polymer and filler, said outer layers having a substantial absence of pores.

In another embodiment the polymer is an ethylene/vinyl acetate copolymer.

In yet another embodiment the polymer is a copolyetherester which is a copolymer of a phthalic acid and a diol providing "hard" segments. Preferably the diol is 1,4-butanediol.

In a further embodiment the polymer is a copolyetherester which is a copolymer of a phthalic acid and a diol providing "soft" segments. Preferably the diol is poly(tetramethyleneether glycol).

In yet another embodiment the polymer has been crosslinked.

In another embodiment the particulate filler has an average equivalent spherical diameter of from 0.50 to 20 μm, especially from 0.50 to 10 μm, and especially from 3 to 10 μm.

In a further embodiment the particulate filler is selected from the group consisting of calcium carbonate, barium sulphate, powdered metals, magnesium carbonate, calcium sulphate, silica, glass spheres, aluminium hydroxide, nylon 6,6, polyethylene terephthalate and poly(styrene divinyl benzene).

As indicated hereinbefore the glass transition temperature of the thermoplastic orientable polymer, $T_g$, is less than about 25° C. This indicates that the polymer is in its so-called rubbery state at room temperature. Preferably, the glass transition temperature should be below 0° C. For applications where low temperature flexibility of the film is important, the glass transition temperature should be below −20° C.

The Vicat softening point of the polymer should be more than about 25° C. In order to prevent the cavities of the core layer from collapsing, it should preferably be above 45° C.

For ease of cavity formation and optimum control of cavity size in the core layer, the ultimate elongation of the polymer should be at least 500% when measured at a temperature between $T_g$ and $T_v$, and especially at least 700%.

As indicated hereinbefore, polymer blends may be used in the present invention. The blends must satisfy the requirements for the polymer, even though individual polymers in such blends need not do so. Examples of such polymer blends include, e.g. (a) two different ethylene/vinyl acetate copolymers and (b) a blend of an ethylene/vinyl acetate copolymer and a linear ethylene/slpha-olefin copolymer having a density of 0.93 g/cm³.

The cavity size of the core layer of the film of this invention is determined, in a large part, by the size of the particulate filler. For example, smaller fillers permit attainment of smaller pores compared to larger fillers at equal volume concentrations. Very fine fillers, e.g. in the order of 0.5 μm in diameter or smaller are difficult to work with, particularly in terms of breaking up agglomerates and obtaining uniform dispersion. Agglomeration of the filler is undesirable, because agglomerated structures tend to incrase the stiffness and decrease the toughness of the film. Additionally, fine fillers tend to cause the outer layers to become porous and of a similar structure to the core layer. It is preferred that the particle size distribution of the particles be reasonably narrow. For example, a particle size distribution in which fewer than about 1% of the particles exceed about 20 μm is preferred, especially when fewer than about 1% exceed 15μm.

Equivalent spherical diameters of particulate fillers may be determined by a variety of experimental techniques A particularly useful instrument for measuring such equivalent spherical diameters is manufactured by Leeds and Northrup, Inc. in association with the trade mark Microtrac.

The concentration of particulate filler in the composition determines, to a large extent, how much the cooled film must be stretched in order to attain a given degree of porosity in the core layer. The preferred concentration is about 25 to 35 vol. percent.

The particulate filler should have a minimal degree of interaction with the thermoplastic polymer. In general, the particulate filler should not be chemically reactive with the polymer. In addition, the melting point of the particulate filler should be sufficiently well above that of the thermoplastic polymer, so that the filler remains substantially undistorted during the melt-blending process.

In general, the polymers useful in this invention have surface tensions in the melt of about 10 to 40 mJ/m$^2$, especially of about 20 to 40 mJ/m$^2$. In general, the inorganic particulate fillers have surface tensions of from about 65 mJ/m$^2$ to about 1200 mJ/m$^2$. Organic particulate fillers have surface tensions in a range similar to that for the thermoplastic polymer. Filler surfaces having very high surface tensions, e.g. glass beads (about 1200 mJ/m$^2$) tend to become coated with low surface tension contaminants, which thus effectively reduce the surface energy of such particulate fillers.

In the case of inorganic fillers, it is often desirable to incorporate into the filled composition an antagonizer in order to reduce the effective surface tension of the filler to a level which is approximately the same as that of the thermoplastic polymer. The term "antagonizer" does not have an established meaning in the art, but is used herein to refer to the organic compound (c) defined in the statement of invention. As will be clear, an antagonizer tends to decrease wetting of surfaces of one material with another material.

The antagonizer may be chosen according to several criteria, i.e. low or no solubility in the thermoplastic polymer, a surface contact angle on the surface of the polymer of less than about 40%. It should be nonfugitive during compounding, and it should be a low-viscosity liquid at compounding temperatures. The surface tension of the antagonizer preferably should be less than or about equal to that of the thermoplastic polymer. The antagonizer need not show a particular chemical or physical affinity for the filler as long as the antagonizer wets the filler at least as effectively as does the thermoplastic polymer, or otherwise shields the filler from the polymer. Not withstanding this, however, appropriate antagonizers with specific affinity for the filler may also be used. For example, when the antagonizer does have a specific affinity for the filler it is only necessary that the surface presented to the polymer be of low surface tension. This is the case, for example, of stearic acid, as the antagonizer, and calcium carbonate as the particulate filler.

When the particulate filler is an organic polymer or is an inorganic filler contaminated with organic material, it is sometimes found that the core layer may be produced without an antagonizer. However, an antagonizer is preferred for optimum performance. In the event that an antagonizer is added to the composition, its concentration should be at least $0.5 \times 10^{-5}$ mole/m$^2$ of filler surface area, with the range of about $1.0 \times 10^{-5}$ to $5 \times 10^{-5}$ mole/m$^2$ being preferred. There may be some deterioration in the properties of the film if concentrations of greater than about $10 \times 10^{-5}$ mole/m$^2$ are used. The preferred concentration of antagonizer may be found through simple experimentation.

The antagonizer may be combined with the filler in any convenient manner, for example at the melt-blending step, or by separately blending the antagonizer with the filler and then melt-blending this blend with the polymer or by adsorbing the antagonizer from a solution in an appropriate solvent on the filler, removing the solvent, and blending the filler containing the antagonizer adsorbed thereon with the polymer.

Scanning electron micrographs of stretched films of the present invention show that the core layer comprises an interconnecting network of cavities which have opened up around the filler particles during stretching. There is virtually a complete absence of cracks in the polymer matrix and a very low degree of apparent adhesion between the polymer and filler. Scanning electron microgrphs of the outer layers of the stretched film show that there is a substantial absence of cavities, even though the particulate filler is embedded in such layer. Scanning electron micrographs are appended as FIGS. 1 to 5 of the drawings. The Figures are explained hereinafter with reference to the Examples.

Compounding of the compositions of the present invention may be accomplished by the known methods for melt blending theremoplastic polymers at temperatures at which thermoplastic polymers are processable. High shear mixing, e.g. with a Banbury (trade mark) mixer, or other high intensity mixers, or continuous mixers, e.g. extruders, is preferred. There appears to be no need to permix ingredients although this may be done if desired.

Films of the present invention may be fabricated by any convenient extrusion technique, e.g. flat film extrusion. Blown film extrusion is preferred. In the blown film method the composition of the present inventionis extruded through a circular die. The resulting tubular film is pulled from the die by cooperating nip rollers which collapse the tubular film at the nip. The tubular film, between the circular die and the nip rollers is sometimes referred to as a bubble. While in the molten or plastic formative state the tubular film is expanded by air or inert gas admitted into the bubble through the centre of the circular die.

The tubular film, which is expanded by introduction of air into the bubble, may be cooled internally and/or externally by directing air onto the film while in the plastic formative state. The film is cooled until it is in the solid state. Cooling to the solid state is often referred to as quenching. Faster quenching, in the blown film method, may be accomplished by passing the expanded film about a cooled mandrel which is situated within the bubble. One such method, using a cooled mandrel, is disclosed in Canadian Patent No. 893,216 which issued Feb. 15, 1972 to M. Bunga and C. V. Thomas. Drawdown of the extrudate is not essential but preferably the drawdown ratio is up to about 40, and more preferably in the range of 2 to 20. After quenching, to the solid state, the film is then stretched. Stretching may be accomplished by any convenient technique. Stretching may be monoaxial in the machine or transverse directions or may be biaxial. Biaxial stretching may be accomplished sequentially or simultaneously. Machine direction orientation is preferred.

Stretching is effected, preferably at least 20° C. above the glass transition temperature of the thermoplastic polymer and preferably below the Vicat softening temperature of the polymer, especially at least 10° C. below the Vicat softening temperature. The preferred temperature for stretching a given composition is at a temperature within the range from 10° C. above the glass transition temperature to the Vicat softening point at which test specimens of the composition display the highest degree of orientability in a standard stress-strain test. Different polymers and compositions thereof exhibit different elastic and viscoelastic behaviour. Thus, differing amounts of stretch must be imposed on different samples in order to obtain some permeability properties. However, in any event, the film must be stretched beyond its yield point in order to attain the permanent deformations necessary for the formations of the cavities in the core layer. Monoaxial elongation of at least about 50% is required, with at least about 125% preferred. When the thermoplastic polymer has a high degree of recovery after stretching, the cavities induced in the core layer may be lost to a large extent in the stretched film. In order to reduce elastic recovery after stretching, the film may be heat set.

The present invention is illustrated by the following examples. In such examples, gas permeabilities were determined by the technique of volume displacement over time at pressures of 0.25 to 0.63 MPa. Water vapour transmission rates were determined according to the procedure of ASTM 96-66BW (inverted cup method).

EXAMPLE I

Water vapor transmission and gas flow rates were determined for several film samples, as shown in the accompanying table. In this example, only Film Sample B falls within the scope of the present invention. The other two Samples are included for comparative purposes.

Film Sample A comprised an extruded film of a copolymer of ethylene and vinyl acetate wherein the vinyl acetate moiety comprised 18% by weight of said copolymer. Said polymer exhibited a density of 0.94 g/cm$^3$, a melt index of 0.7 dg/min, a flexural modulus of 62 MPa, a T$_g$ of $-25°$ C., and a Vicat softening point of 64° C.

Film Sample B comprised the copolymer of Film Sample A which had been melt blended in a Banbury mixer 60% by weight (about 26% by volume) of Atomite (trade mark) CaCO$_3$ from Thomson-Weiman, (average particle size 5.7 μm), 2.9% by weight of Sunthene 4240 (trade mark) naphthenic processing oil from Sun Oil Corp, and 0.6% by weight of Hystrene 4516 (trade mark) stearic acid ($9 \times 10^{-5}$ moles/m$^2$ of filler surface area) from Humko Corporation.

The compositions of Film Samples A and B were blown into film 71 μm thick using a 10.2 cm diameter circular die with a die gap of 1020 μm, with a blow-up ratio of 3.6:1, at a line speed of 16 m/min. Said blown film was subsequently oriented at a stretch ratio of 4.1 in the machine direction on a narrow-gap orienter at a temperature of 40° C., with a gap of 1250 μm.

Film Sample C was fabricated from the same melt-blended composition described for Film Sample B, but Film Sample C was blown into film 70 μm thick using a 20.3 cm diameter circular die with a die gap of 380 μm, with a blow-up ratio of 2.5:1, at a line speed of about 6 m/min. Said blown film was oriented at a stretch ratio of 4.5 in the machine direction on a narrow-gap orienter at a temperature of 32°–35° C., with a gap of 1250 μm, followed by a post-draw 1.08× and heat setting at 60° C.

It is shown in the accompanying table that Film Sample B exhibits about one hundred times the gas flow of Film Sample A while exhibiting only ten times the WVTR. On the other hand, Film Sample B still exhibits far less gas or water vapour flow than Film Sample C.

With respect to the packaging of certain farm produce, Film Sample B represents significant advantages over the prior art. Spoilage due to accelerated ripening is commonly experienced when films exhibiting gas flow rates in the range of those of Film Sample A are employed for packaging produce. The WVTR of Film Sample A is also sufficiently low that, when films exhibiting WVTR in the same range as Film Sample A are employed in packaging produce, the normal moisture given off by the ripening produce accumulates and induces mold growth. The $-100\times$ higher gas flow rates of Sample B with respect to Sample A for films of comparable thickness and handleability is expected to provide lower spoilage due to accelerated ripening. Further, the higher WVTR of Film Sample B with respect to that of Film Sample A is expected to retard mould formation.

While the gas flow rates of Film Sample C are very high and may be expected to retard spoilage due to accelerated ripening at least as effectively as Film Sample B, the high WVTR brings with it the significant risk of drying out of the produce through excessive loss of moisture. Additionally, the presence of significant surface porosity leaves open the possibility of contamination from the outside, by low surface tension liquids such as oils, fuels, greases, etc., and by aerosols. The essentially pore-free or low density surface of Film Sample B represents an improvement thereto.

| Sample # | Thickness (micrometers) | WVTR (g/sq m-24 hrs-cm Hg) | GAS FLOW RATE (cc/min-sq cm-cm Hg $\times 10^4$) | | |
|---|---|---|---|---|---|
| | | | AIR | ETHENE | CARBON DIOXIDE |
| A | 51 | 10–15 | 0.15 | 0.22 | 0.60 |
| B | 33 | 100 | 90 | 110 | 90 |
| C | 28 | 1100 | 7400 | 10,000 | 7300 |

EXAMPLE II

In this example it is shown that vapour and gas flow rates are largely unaltered by changes in drawdown ratio (DDR), extent of orientation or film thickness.

Film Sample D was fabricated from the same melt blend as Film Sample B and was fabricated into film 178 μm thick in a similar manner except that the line speed was reduced to 6.4 m/min. The blown film of Film Sample D was then oriented under the same conditions as Film Sample B, except that the machine direction orientation was performed at a stretch ratio of 4.9 and at 30° C.

DDR of Film Sample D was 1.5, whereas that of Film Sample B was 4.0. The thickness of Film Sample D was 89 μm, whereas that of Film Sample B was 33 μm. The accompanying table shows the water vapour and gas permeation rates of said Film Sample D.

Although the gas flow rates of Film Sample D were higher than those of Film Sample B, they were of the same order of magnitude. Both Film Samples B and D fall within the scope of the present invention.

| Sample # | Thickness (micro- meters) | WVTR (g/sq m- 24 hrs-cm Hg) | GAS FLOW RATE (cc/min-sq cm-cm Hg) $\times 10^4$ | | |
|---|---|---|---|---|---|
| | | | AIR | ETHENE | CARBON DIOXIDE |
| D | 89 | 110 | 280 | 340 | 269 |

EXAMPLE III

In ths example it is shown that Film Samples B and D are similar to each other in that each is an example of a so-called heterogeneous membrane consisting essentially of a highly porous interior structure completely enclosed by a low-porosity skin.

Films Samples B and D were examined by scanning electron microscopy (SEM) in both cross-section and surface and found to have the structures shown in the accompanying scanning electron micrographs.

Figure 1:
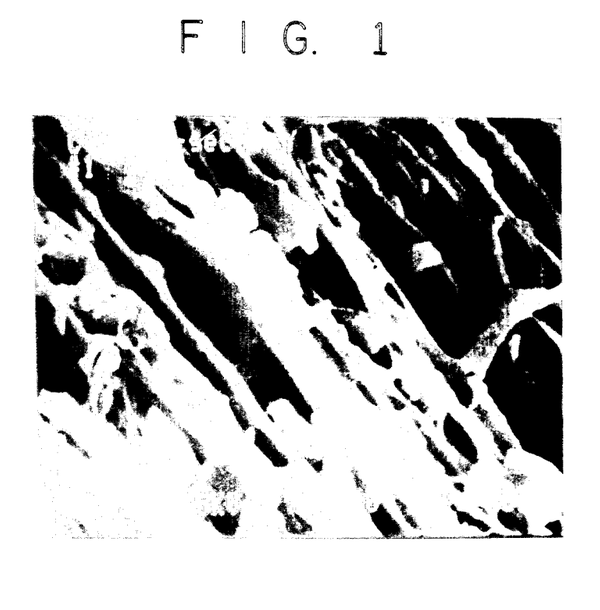
Figure 2:
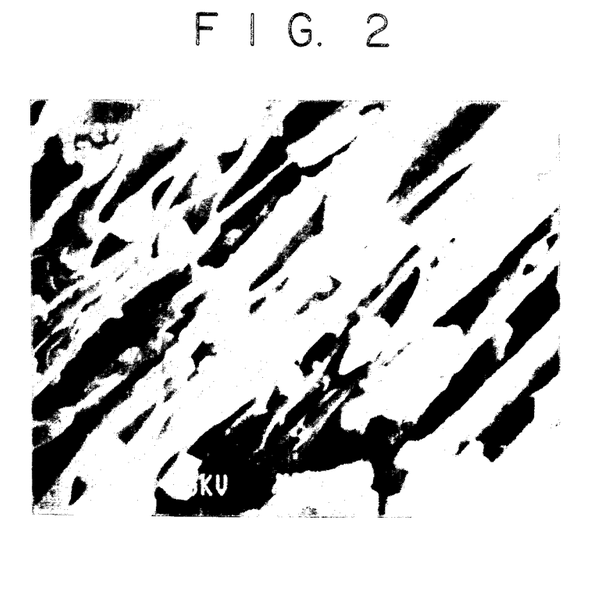

The SEM's of FIGS. 1 and 2 show that the two samples exhibit very similar highly porous cross-sections which appear to be quite uniform across most of the thickness of the sample.

Figure 3:
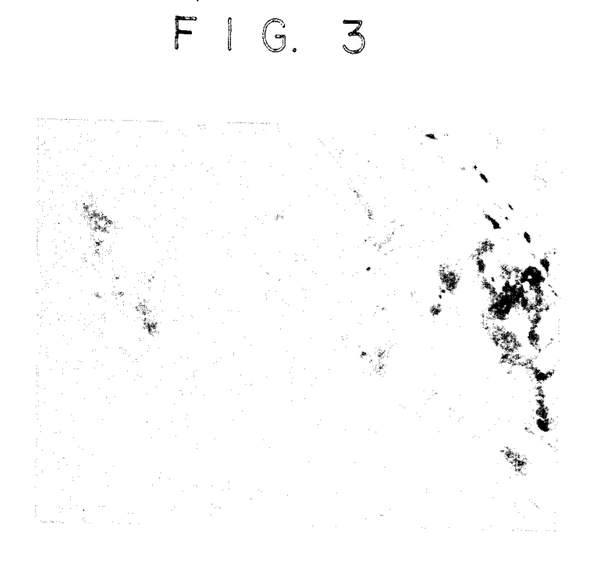
Figure 4:
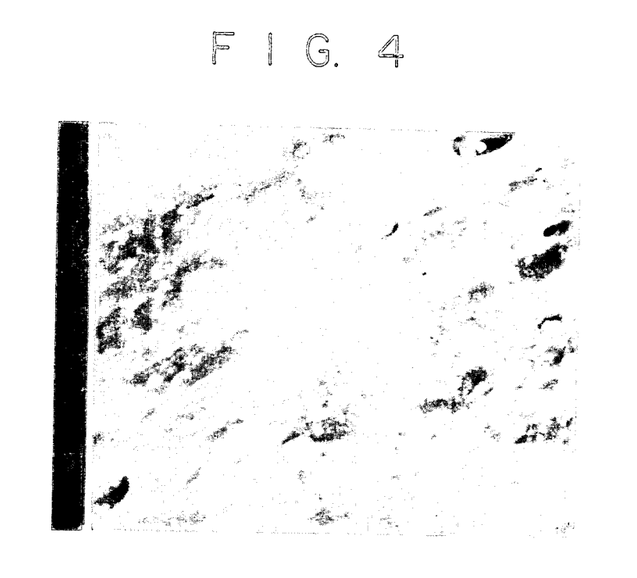

The SEM's of FIGS. 3 and 4 show that the two samples exhibit surfaces which appear to be nonporous or only very slightly nonporous. Whereas the surface of Film Sample B appears to be virtually pore-free, that of Film Sample D exhibits a small number of pores. However, a high percentage of those pores appear not to be connected to the interior.

Figure 5:
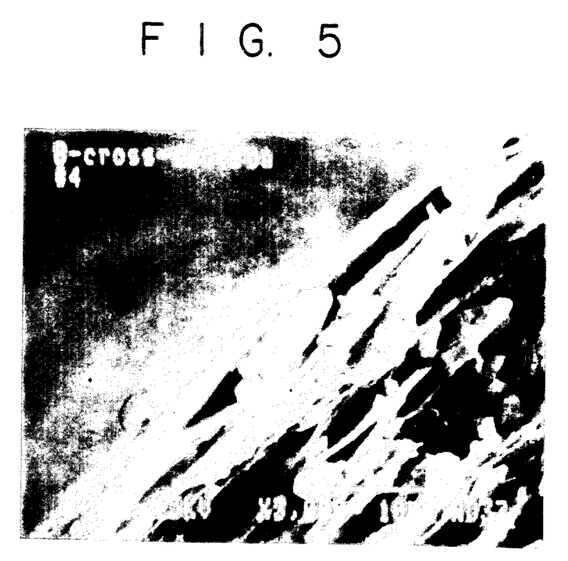

The SEM of FIG. 5 dramatically exemplifies the formation of a thin (about 1 micrometer) polymer-rich skin over the otherwise highly porous interior, which morphology gives rise to the unique properties of the films of the present invention.

EXAMPLE IV

Film Sample C, which is not of the present invention, was examined using SEM for both the cross-section and the surface. From the SEM, it appears that the cross-section of Film Sample C is quite similar to that of Films Samples B and D, in that all three exhibit a highly porous interior extending most of the way across the sample. In contrast to the surfaces of Film Samples B and D, the surface of Film Sample C contains more numerous pores, most of which appear to be connected to the interior.

EXAMPLE V

In this example it is shown that the WVTR exhibited by the films of this invention is particularly determined by the die gap employed during film fabrication and that, in particular, there appears to exist a minimum die gap range below which the film will acquire more of the character of a microporous film than that of a heterogeneous membrane.

Film Sample E was fabricated by a method identical to that of Film Sample C except that it was oriented at a stretch ratio of 4.25 in the machine direction at a temperature of 43° C., and was subject to a post-draw of 1.10×.

Film Sample F was fabricated in a manner identical to that of Film Sample E, except that the die gap in the circular die was 760 μm.

The accompanying table shows the WVTR results obtained from said Samples E and F. The WVTR of Sample E, while higher than those of Samples B and D, is still indicative of a film of which the surface is substantially less porous than that of Sample F. Thus, for the particular composition of matter of which Samples B-F were fabricated, it appears that a die gap of about 800 μm, represents the minimum die gap required for attaining the desired low-porosity surface of this invention.

| Sample # | Thickness (micrometers) | WVTR (g/sq m-24 hrs-cm Hg) | Die Gap μm |
|---|---|---|---|
| E | 28 | 364 | 760 |
| F | 25 | 822 | 380 |

EXAMPLE VI

In this example it is shown that a different composition, particularly one that differs in matrix polymer viscosity or filler size, or both, may exhibit a different minimum die gap below which a surface substantially free of porosity cannot be obtained.

Film Sample G was fabricated from a composition of a copolymer of ethylene and vinyl acetate of which the vinyl acetate portion consisted of 15% by weight of the total, which copolymer was melt-blended with 60.3% by weight of a about 2 μm average equivalent spherical diameter Supermite (trade mark) $CaCO_3$ from Thomson-Weiman, 3.15% by weight of the naphthenic oil of Film Sample B, 1.7% stearic acid ($8.9 \times 10^{-5}$ moles/m² filler surface area) and 5000 ppm (with respect to resin) of an antioxidant.

Said melt blend was fabricated into blown film of a thickness of 71 μm using a 10.2 cm diameter circular die with a die gap of 1020 μm, a blow-up ratio of 3.6 and line speed of 16 m/min. Said blown film was oriented at a stretch ratio of 4.9 in the machine direction using a narrow gap orienter with a gap of 1250 μm at a temperature of 35° C., a post-draw of 1.08× and heat setting at 60° C. The resultant film was 33 μm thick, with WVTR of 940.

The die gap of this example was the same as for Film Sample B. From this data it is believed that the minumum die gap required for the practice of this invention exceeds 1020 μm.

We claim:

1. A heterogeneous membrane film comprising a composition comprising a thermoplastic orientable polymer and a particulate filler, said thermoplastic orientable polymer being characterized by (i) a hydrophobic surface, as indicated by a contact angle between said surface and a droplet of water of at least about 40°, (ii) a glass transition temperature $T_g$ of less than about 25°

C., (iii) a Vicat softening point $T_v$ of more than about 25° C., (iv) an ultimate elongation at a temperature between $T_g$ and $T_v$ of at least 100%, and (v) a flexural modulus at 25° C. of less than about 200 MPa, said polymer being selected from the group consisting of (a) at least one copolymer of ethylene and at least one other monomer, said monomer being selected from the group consisting of vinyl esters of saturated $C_1$-$C_4$ carboxylic acids, unsaturated $C_3$-$C_5$ mono- or dicarboxylic acids, salts of such mono- or dicarboxylic acids with ammonia and/or with metals of Groups I-IV of the Periodic Table, and $C_1$-$C_8$ alkyl esters of said mono- or dicarboxylic acids; b) at least one terpolymer of the general formula E/X/Y, where E is ethylene, X is butyl acrylate or vinyl acetate, and Y is carbon monoxide or sulphur dioxide, the weight porportion of Y to (E+X+Y) being up to about 15%; (c) at least one elastomeric dipolymers and terpolymers or ethylene with other 1-olefins and 1,4-dienes; (d) mixtures of at least two of (a), (b) and (c); and (e) at least one copolyetherester; said particulate filler being in a concentration of about 20-40%, based on the volume of the composition, said particulate filler being chemically unreactive with the polymer and dispersed therein by melt-blending, and being characterized by (i) a sufficiently high softening temperature to avoid particle distortion at the lowest temperature at which the polymer is sufficiently fluid to be satisfactorily melt-blended, (ii) an aspect ratio of less than about 3, (iii) an average equivalent spherical diameter of about 0.50-50 μm, (iv) an at most negligible electrostatic or dipole attraction to the polymer, and (v) a surface tension which either has at the lowest temperature at which the polymer is sufficiently fluid to be satisfactorily melt-blended a value at most about equal to that of the polymer or has been modified by the adsorption of an organic compound to have at most such a value, said organic compound, if present, being liquid at the lowest temperature at which the polymer is sufficiently fluid to be satisfactorily melt-blended and being capable at that temperature of being adsorbed on the surface of the filler to the extent of at least about $0.5 \times 10^{-5}$ mole of the organic compound per square meter of surface area of the filler, as calculated from the average equivalent spherical diameter of the filler, and being present in an amount at least sufficient to satisfy the surface tension requirement, said organic compound being characterized by (i) at most negligible solubility on the polymer at the melt-blending temperature, (ii) chemical inertness to the polymer, (iii) a number average molecular weight of 100-10 000, and (iv) a surface tension which at a temperature at which the organic compound is liquid has a value at most about equal to that of the polymer, said film being characterized by a core layer sandwiched between two outer layers, said core layer having cavities consisting of a network of voids surrounding the filler particles, ahving a substantial absence of cracks in the polymer and a low degree of apparent adhesion between polymer and filler, said outer layers having a substantial absence of pores.

2. A heterogeneous membrane film according to claim 1 wherein the particulate filler is selected from the group consisting of calcium carbonate, calcium sulphate, barium sulphate, powdered metals, magnesium carbonate, silica, glass spheres, aluminium hydroxide, nylon 6,6, polyethylene terephthalate and poly(styrene divinyl benzene).

3. A heterogeneous membrane film according to claim 1 wherein the average equivalent spherical diameter is from 0.5 to 20 μm.

4. A heterogeneous membrane film according to claim 1 wherein the average equivalent spherical diameter is from 0.5 to 10 μm.

5. A heterogeneous membrane film according to claim 2 wherein the polymer is an ethylene/vinyl acetate polymer.

6. A heterogeneous membrane film according to claim 1 wherein the polymer is a blend selected from the group consisting of (a) two different ethylene/vinyl acetate copolymers and (b) a blend of an ethylene/vinyl acetate copolymer and a linear ethylene/alpha-olefin copolymer having a density of 0.93 g/cm³ or less.

* * * * *